Patented Apr. 1, 1952

2,590,986

UNITED STATES PATENT OFFICE 2,590,986

PRODUCTION OF ALIPHATIC NITRILES

Alexander F. MacLean, Robstown, and Donald E. Pickart, Corpus Christi, Tex., assignors to Celanese Corporation of America, New York, N. Y., a corporation of Delaware No Drawing. Application March 27, 1950, Serial No. 152,266

3 Claims. (Cl. 260—465.2)

This invention relates to the production of nitriles and relates more particularly to an improved process for the production of aliphatic nitriles by the reaction of ammonia with an aliphatic carboxylic acid.

An object of this invention is the provision of an improved, continuous process for the production of aliphatic nitriles by the catalytic vapor phase reaction of ammonia with an aliphatic carboxylic acid.

Another object of the invention is to provide a continuous process for the production of aliphatic nitriles whereby said nitriles are obtained in high purity and in improved yield.

Other objects of this invention will appear from the following detailed description.

Aliphatic nitriles may be obtained by passing a mixture of ammonia and a saturated aliphatic, monocarboxylic acid over a catalyst such as thoria or alumina in the form of a fixed bed employing reaction temperatures of about 500° C. The yields obtained by this fixed bed catalytic process are limited and maximum conversions of only up to 48% per pass with an efficiency of at most 53% are obtained. Increased conversions and efficiencies would, of course, greatly increase the commercial value of this catalytic process.

We have now found that aliphatic nitriles may be obtained with substantially increased conversion and efficiency by the catalytic vapor phase reaction of ammonia with a saturated monocarboxylic aliphatic acid having at least two carbon atoms if said catalytic reaction is effected employing the catalyst in a fluidized form. Surprisingly enough, not only does the degree of conversion and efficiency of conversion per pass increase markedly with the use of a fluidized catalyst, but the optimum temperature suitable for carrying out the reaction is also decreased appreciably.

In forming said aliphatic nitriles in accordance with our novel process, the aliphatic carboxylic acid employed is vaporized, 1 to 2 mols of ammonia are mixed therewith for each mol of vaporized aliphatic acid and the resulting reaction mixture is then passed through the catalyst bed, maintained at a temperature of 300 to 400° C., at a velocity sufficient to maintain the catalyst particles in a fluidized state. The velocity at which the vaporized reaction mixture is passed through the catalyst bed and the depth of the bed employed are also controlled so as to maintain the vapors in contact with the catalyst particles for from 0.1 to 1.0 seconds. Superficial gas velocities of 0.7 to 6.0 feet per second through the reactor holding the catalyst particles are satisfactory to maintain proper fluidization of said catalyst particles. The superficial gas velocity is based on the volume of reactants at the temperature and pressure at which the gases are maintained while in contact with the catalyst.

As examples of catalysts which may be employed in accordance with our novel process for the production of aliphatic nitriles, there may be mentioned activated alumina, alumina-thoria gel, or silica-alumina gel.

Optimum results are obtained in the production of said aliphatic nitriles by reacting a saturated, monocarboxylic aliphatic acid with ammonia. Examples of acids which may be employed in our process are acetic acid, propionic acid, butyric acid, isobutyric acid, valeric acid, isovaleric acid, caproic acid, heptoic acid, capric acid and lauric acid.

In order further to illustrate our invention, but without being limited thereto, the following examples are given:

Example I

Acetic acid is continuously vaporized and the vapors then mixed with gaseous ammonia in a ratio of 1.25 mols of ammonia for each mol of acetic acid. The gaseous reaction mixture thus formed is then passed through a reactor charged with an activated alumina catalyst in finely divided particle form and maintained at a temperature of 350° C. The velocity of the gaseous reaction mixture through the reactor is about 5.0 feet per second, which velocity is sufficient to fluidize the catalyst. The depth of the fluidized catalyst bed is such that the vapors are in contact with the catalyst for about 0.14 second. The gaseous reaction product leaving the reactor is passed through a water cooled scrubber countercurrent to a stream of xylene so as to condense the acetonitrile formed. The condensate thus obtained separates into two layers, the upper layer comprising a solution of acetonitrile in xylene and the lower layer comprising an aqueous solution containing both unreacted acetic acid and carbon dioxide in the form of their ammonium salts. Distillation of the xylene layer yields two fractions, a minor initial fraction containing a small amount of water and a major fraction comprising pure acetonitrile. Based on the acetic acid employed, the acetonitrile is obtained with a conversion of 93% per pass and with an efficiency of conversion of 97%. The acetonitrile is obtained in an amount of about 0.52 part by weight per hour for each part by weight of catalyst employed.

Example II

Propionic acid is vaporized and mixed with ammonia in a ratio of about one mol of propionic acid to 1.25 mols of ammonia. The gaseous reaction mixture is then passed through a reactor maintained at 325° C. and charged with an activated alumina catalyst in particle form. The velocity of the vapors through the reactor is maintained at about 5.0 feet per second and the depth of the fluidized catalyst bed is such that the vaporized reaction mixture is in contact with the catalyst particles for about 0.14 second. The reaction product formed is then passed through a water cooled scrubber countercurrent to a downwardly flowing stream of xylene. The condensate thus obtained separates into two layers, an upper layer comprising a solution of propionitrile in xylene and a lower layer comprising an aqueous solution of unreacted propionic acid and of byproduct carbon dioxide, each in the form of the ammonium salt. The xylene layer is separated from the aqueous layer and distilled. The first distillate comprises a water-propionitrile azeotrope after which pure propionitrile distills over. The propionitrile is formed by our catalytic process with a conversion of 89% per pass and an efficiency of conversion of 94%, based on the propionic acid reacted. The propionitrile is formed in an amount of about 0.57 part by weight per hour for each part by weight of catalyst employed.

It is to be understood that the foregoing detailed description is given merely by way of illustration and that many variations may be made therein without departing from the spirit of our invention.

Having described our invention, what we desire to secure by Letters Patent is:

1. Process for the production of aliphatic nitriles, which comprises vaporizing a saturated aliphatic monocarboxylic acid containing at least two carbon atoms, mixing the vapors with ammonia in a ratio of 1 to 2 mols of ammonia for each mol of said acid vapor, passing the resulting reaction mixture through a reaction zone containing a catalyst selected from the group consisting of activated alumina, silica-alumina gel and alumina-thoria gel maintained in a fluidized state and at a temperature of from 300 to 400° C., allowing the reaction mixture to remain in contact with the catalyst for 0.1 to 1.0 seconds passing the mixture of reaction products formed into a stream of cooled xylene to condense the same, separating a xylene solution of aliphatic nitrile from the condensate and fractionally distilling the xylene solution to obtain purified aliphatic nitrile.

2. Process for the production of acetonitrile, which comprises vaporizing acetic acid, mixing the vapors with ammonia in a ratio of 1.25 mols of ammonia for each mol of acetic acid vapor, passing the resulting reaction mixture through a reaction zone containing an activated alumina catalyst in a fluidized state and maintained at about 350° C., allowing the reaction mixture to remain in contact with catalyst for about 0.14 second, passing the mixture of reaction products formed into a stream of cooled xylene to condense the same, separating a xylene solution of acetonitrile from the condensate and fractionally distilling the xylene solution to obtain purified acetonitrile.

3. Process for the production of propionitrile, which comprises vaporizing propionic acid, mixing the vapors with ammonia in a ratio of 1.25 mols of ammonia for each mol of propionic acid vapor, passing the resulting reaction mixture through a reaction zone containing an activated alumina catalyst in a fluidized state and maintained at about 325° C., allowing the reaction mixture to remain in contact with the catalyst for about 0.14 second, passing the mixture of reaction products formed into a stream of cooled xylene to condense the same, separating a xylene solution of propionitrile from the condensate and fractionally distilling the xylene solution to obtain purified propionitrile.

ALEXANDER F. MacLEAN.
DONALD E. PICKART.

REFERENCES CITED

The following references are of record in the file of this patent:

UNITED STATES PATENTS

| Number | Name | Date |
|---|---|---|
| 2,177,619 | Nicodemus et al. | Oct. 24, 1939 |
| 2,205,076 | Wortz | June 18, 1940 |
| 2,229,219 | Oxley et al. | Jan. 21, 1941 |
| 2,414,393 | Potts | Jan. 14, 1947 |
| 2,448,275 | Potts | Aug. 31, 1948 |

OTHER REFERENCES

Mitchell et al., J. Am. Chem. Soc., vol. 53, pp. 321–330 (1931).